Oct. 30, 1956     E. H. WOLGAST     2,768,627
STONE DEFLECTING MEANS FOR A CYLINDER AND
CONCAVE TYPE THRESHER
Filed Nov. 10, 1953
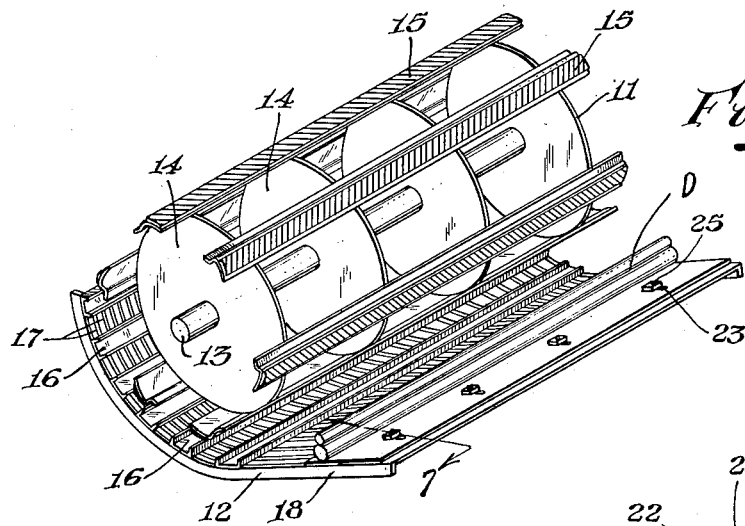
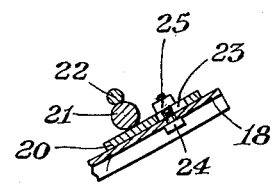
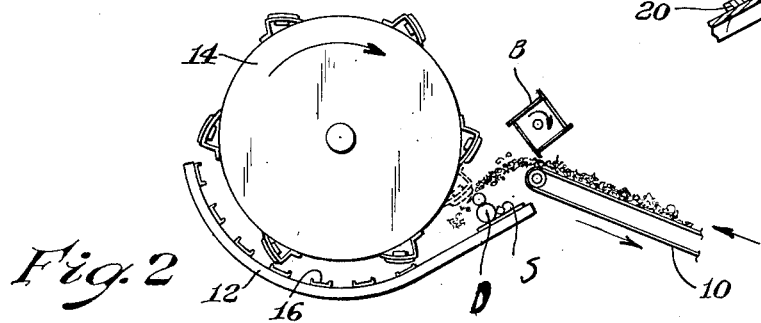
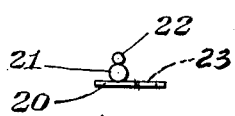
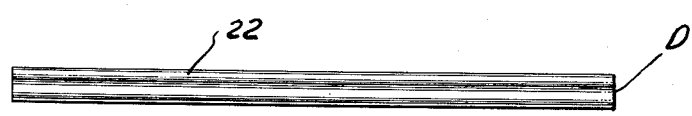
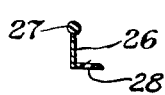
INVENTOR.
Ervin H. Wolgast
BY
Fearman & Fearman
ATTORNEYS

United States Patent Office 2,768,627
Patented Oct. 30, 1956

2,768,627

STONE DEFLECTING MEANS FOR A CYLINDER AND CONCAVE TYPE THRESHER

Ervin H. Wolgast, Merrill, Mich.

Application November 10, 1953, Serial No. 391,164

8 Claims. (Cl. 130—27)

This invention relates to stone deflecting means for combines and agricultural machines of like nature.

As is well known, stones of varying size are frequently picked up by the harvesting mechanism of conventional threshing machines or combines along with the crops to be threshed and are carried to the threshing mechanisms thereof whence they tend to pass with the crop between the threshing cylinders and concaves with the result that the latter are often severely damaged. It is then necessary to suspend the threshing operation to repair the damaged elements or if the damage is only slight, often the threshing operation is continued at reduced efficiency with the result that a substantial portion of the grain or seeds are not separated and are discharged with the straw or vines and lost.

One of the prime objects of the invention is to design stone deflecting means which can be incorporated in the combine to prevent stones and the like from reaching and damaging the threshing mechanism.

A further object of the invention is to provide stone deflecting means of the type described on which the deflected stones collect so that they can be very readily removed from the machine when a number of them have accumulated.

Another object of the invention is to design stone deflecting means of substantial and durable construction which can be readily installed in existing combines of various types, or either rasp bar or toothed cylinder construction, without interfering with the operation thereof or necessitating the repositioning or redesigning of any of the elements of the combine.

A further object of the invention is to design stone deflecting means of this type which increases the threshing efficiency of a conventional combine particularly with crops which are difficult to thresh such as winter wheat, in that it functions somewhat as an initial concave bar during the threshing operation.

Another object of the invention is to provide stone deflecting means which can be positioned in front of the threshing cylinder and tends to prevent large "slugs" or bunches of tangled vines and the like from passing between the cylinder and concave of the combine until they are broken up and chewed into the machine in small portions by the cylinder.

A further object of the invention is to provide stone deflecting means which are adjustable toward or away from the vertically adjustable threshing cylinder so as to maintain proper clearance requirements with relation thereto.

A still further object of the invention is to provide stone deflecting means of simple and practical design which can be economically formed of conventional structural members.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a perspective plan view of the conventional threshing cylinder and concave with the stone deflector shown mounted on the front of the concave.

Fig. 2 is a side elevational view thereof with the feed conveyor and feed beater of the combine also being shown, the broken lines indicating a rasp bar moving past the deflector member.

Fig. 3 is a side elevational view of one of my deflector members.

Fig. 4 is an end elevational view thereof.

Fig. 5 is a side elevational view of another embodiment of the invention.

Fig. 6 is an end elevational view thereof.

Fig. 7 is a fragmentary, sectional, elevational view taken on the line 7—7 of Fig. 1, indicating the manner in which the deflector member is adjustably secured to the concave.

Referring now more particularly to the accompanying drawing wherein I have shown preferred embodiments of my invention, I have shown in Fig. 2 a feeder conveyor belt 10 which receives the crop after it has been cut by means (not shown) and carries it to a transversely disposed threshing cylinder 11 which cooperates with a combination concave and grate 12 to thresh the crop. While the cylinder 11 and concave 12 vary in design in various machines, I have shown conventional units such as employed by many leading manufacturers in machines of this type.

The cylinder 11 comprises a shaft 13 on which are secured a plurality of transversely spaced-apart support plates 14 of generally circular configuration and mounted on the peripheral edges of the plates 14 at circumferential intervals are raps bars 15. The cylinder 11 is mounted a spaced distance above the combination concave and grate 12 which includes spaced concave channel bars 16 between which are provided rows of slots 17 leading in a grain pan (not shown) below the concave.

The cylinder is powered in the conventional manner and is adjustable as usual relative to the upper surface of the concave 12. While I have shown what is commonly termed a rasp bar unit, it will be apparent that I could have instead shown a unit in which intermeshing teeth were provided on the cylinder and concave. A feed beater B is generally provided as shown to aid in discharging the crop from the conveyor 10.

Designed to be rigidly secured on the upwardly inclined, forward extension 18 of the concave 12 is my stone deflecting member D which may comprise in one embodiment a plate 20 with a rod 21 of relatively large diameter fixed adjacent the rear edge thereof, a rod 22 of relatively small diameter being welded or otherwise rigidly fixed on top of the rod 21. The deflecting member D is mounted as shown so that there is relatively little clearance between the upper rod 22 and the path of the rasp bars 15. Transversely spaced slots 23 are provided in the plate 20 and threaded lugs 24 extend from the extension plate 18 through the slots 23 and are secured in position by nuts 25. Thus, it will be seen that the deflector member D is adjustable toward and away from the threshing cylinder 11 to vary the working clearance therebetween and to compensate for vertical adjustment of the cylinder when different crops are to be threshed.

Combines of the type described are employed to thresh a wide variety of seed crops such as wheat, beans, peas and the like, and in operation, the plants are delivered to the cylinder by the belt conveyor for threshing. Stones which are carried in with the plants, being of hard, inflexible texture, are deflected by the curved surface of the hard surfaced rod 22 and tend to drop onto the forward portion of the plate 20 as indicated at S in Fig. 2, while the soft and pliable plants pass over the rod 22 into the space between the cylinder and concave 12 wherein they are thrashed and the grain kernels or seeds are separated from the plants. The latter, of course, pass out over the rear edge of the concave 12 to a straw or chaff rack or the like (not shown) for discharge, while the grain kernels or seeds pass through the slot 17 in the concave to the grain pan (not shown) below. The stones S which collect on the plate 20 can be removed at intervals when a sufficient number have accumulated.

With such crops as beans and peas where the crops are delivered in tangled masses, it will be apparent that the incidence of stones is much greater than with some other crops. Further, the deflector member D tends to prevent large "slugs" or bunches from passing into the concave 12 until they are chewed up by the action of the rasp bar cylinder 11. It is also important to note that the rod 22 tends to function as an initial concave bar and increases the threshing efficiency of the machine.

In Figs. 5 and 6, I have shown a modified embodiment of my invention in which an angle member 26 serves as the deflecting member and in this embodiment, a rod 27 is mounted on the upper end thereof. The horizontal leg of the angle member 26 is provided with transversely spaced slots 28 similar to the slots 23 in the plate 20 of the deflector shown in Figs. 1–4, so that the member 26 can be similarly adjustably mounted on the extension 18 of the concave. The operation of this modification of my invention is identical with that of the deflector previously described.

It is to be understood that various equivalent changes may be made in the various elements which comprise my invention without departing from the spirit thereof or the scope of the appended claims.

What I claim is:

1. In a combine in combination with a driven threshing cylinder and a concave positioned a spaced distance under said cylinder, conveying means above and forwardly of said concave for carrying the crop to the space between said cylinder and concave, and upright stone deflecting means of substantially the length of said cylinder positioned between said conveying means and concave and extending upwardly into the path of said crop to deflect stones carried in with said crop and prevent them from reaching the space between said cylinder and concave the upper end of said deflecting means terminating just short of the cylinder to define a space of relatively narrow clearance between said means and cylinder substantially equal to the space between said cylinder and concave and being sufficiently narrow so that it cannot support a stone larger than said latter space on the upper face thereof.

2. In a combine in combination with a transversely disposed driven threshing cylinder and a concave positioned a spaced distance under said cylinder, a conveyor with its discharge end mounted above and forwardly of said concave for carrying the crop to the space between said cylinder and combine, and a transversely disposed, hard-surfaced upright stone deflecting member of substantially the length of said cylinder positioned between the said end of said conveyor and the concave and extending upwardly into the path of said crop to define a space of relatively narrow clearance between said member and cylinder, the upper front edge of said member being of curved configuration to deflect stones carried with said crop downwardly.

3. In a combine in combination with a transversely disposed threshing cylinder and a combined concave grill mounted thereunder a spaced distance therefrom, a longitudinally disposed driven belt conveyor with its rear discharge end disposed above said concave and spaced a predetermined distance forwardly of said cylinder, said concave having an upwardly inclined extension projecting forwardly of said cylinder, a transversely disposed, rigid stone deflector including a base plate and an upright member mounted adjacent the rear edge thereof, said deflector being of substantially the length of said cylinder and adjustably secured on the extension of said concave between the rear end of said conveyor and said cylinder with the upright member extending upwardly into the path of said crop and defining a narrow clearance between said member and cylinder.

4. The combination defined in claim 3 in which said upright member comprises a rod of relatively large diameter with a rod of relatively small diameter secured to the top thereof.

5. The combination defined in claim 3 in which said base and upright member comprise an angle bar and a rod is mounted on the upper end thereof.

6. The combination defined in claim 3 in which longitudinally extending, transversely spaced slots are provided in said base, and means are provided for securing said deflector to said concave in various adjusted positions relative to said cylinder.

7. In a combine in combination with a driven threshing cylinder and a concave positioned a spaced distance under said cylinder, conveying means with a discharge end substantially disposed above and forwardly of said concave for carrying the crop to the space between said cylinder and concave, and upright stone deflecting means of substantially the length of said cylinder rigidly positioned between said conveying means and concave and extending upwardly toward said cylinder into the path of said crop to deflect stones carried in with said crop and prevent them from reaching the space between said cylinder and concave, said deflecting means having a relatively narrow upper end with a curvilinear front edge and terminating just short of the cylinder to define a space of narrow clearance therebetween which is substantially equivalent to the space between said cylinder and concave.

8. In a combine in combination with a threshing cylinder revolving in a given direction, threshing members on said cylinder; a concave positioned a spaced distance under said cylinder and members thereon, conveying means with a discharge end substantially disposed above and forwardly of said concave for carrying the crop to the space between said cylinder and concave, relatively narrow upright stone deflecting means of substantially the length of said cylinder rigidly positioned between said conveying means and concave and extending upwardly at the front of said cylinder toward said cylinder into the path of said crop to define a relatively narrow clearance between said cylinder and deflector means which will not pass stones larger than the space between said threshing members and concave into the space between said cylinder and concave, said cylinder revolving in a direction to pass a threshing member on the cylinder from a position directly adjacent and above said deflecting means immediately to a position rearward and downward thereof so as to feed said crop into the space between said cylinder and concave.

References Cited in the file of this patent

UNITED STATES PATENTS

| 1,631,446 | Worthington | June 7, 1927 |
| 2,305,964 | Harrison et al. | Dec. 22, 1942 |
| 2,424,171 | Huddle | July 15, 1947 |
| 2,526,535 | Brown | Oct. 17, 1950 |
| 2,528,232 | Krause | Oct. 31, 1950 |